US009274322B1

(12) United States Patent
Yin et al.

(10) Patent No.: US 9,274,322 B1
(45) Date of Patent: Mar. 1, 2016

(54) THREE-PIECE ALL-ASPHERIC ADAPTER FISHEYE LENS

(71) Applicant: OmniVision Technologies, Inc., Santa Clara, CA (US)

(72) Inventors: Chuen-Yi Yin, New Taipei (TW); Jau-Jan Deng, Taipei (TW)

(73) Assignee: OmniVision Technologies, Inc., Santa Clara, CA (US)

( * ) Notice: Subject to any disclaimer, the term of this patent is extended or adjusted under 35 U.S.C. 154(b) by 92 days.

(21) Appl. No.: 14/465,013

(22) Filed: Aug. 21, 2014

(51) Int. Cl.

| | |
|---|---|
| ***G02B 3/02*** | (2006.01) |
| ***G02B 13/18*** | (2006.01) |
| ***G02B 9/12*** | (2006.01) |
| ***G02B 13/06*** | (2006.01) |
| ***G03B 17/56*** | (2006.01) |
| ***G02B 27/00*** | (2006.01) |
| *G03B 17/14* | (2006.01) |
| *G02B 9/16* | (2006.01) |
| *G02B 13/04* | (2006.01) |
| *G02B 13/00* | (2006.01) |
| *G02B 9/34* | (2006.01) |

(52) U.S. Cl.

CPC *G02B 13/06* (2013.01); *G02B 9/12* (2013.01); *G02B 13/18* (2013.01); *G02B 27/0025* (2013.01); *G03B 17/565* (2013.01); *G02B 9/16* (2013.01); *G02B 9/34* (2013.01); *G02B 13/004* (2013.01); *G02B 13/0035* (2013.01); *G02B 13/04* (2013.01); *G03B 17/14* (2013.01)

(58) Field of Classification Search

CPC ........ G02B 13/004; G02B 9/34; G02B 13/04; G02B 13/18; G02B 13/0035; G02B 9/12; G02B 9/16; G03B 17/565; G03B 17/14

USPC ......... 359/648, 672–675, 715, 716, 753, 781, 359/784

See application file for complete search history.

(56) References Cited

U.S. PATENT DOCUMENTS

| | | | | |
|---|---|---|---|---|
| 3,734,600 A * | 5/1973 | Shimizu | G02B 13/06 359/723 |
| 6,128,145 A * | 10/2000 | Nagaoka | H04N 7/183 359/749 |
| 6,504,655 B2 | 1/2003 | Shibayama | |
| 7,023,628 B1 * | 4/2006 | Ning | G02B 13/06 359/774 |
| 8,134,787 B2 * | 3/2012 | Saitoh | G02B 13/06 359/715 |
| 8,279,544 B1 | 10/2012 | O'Neill | |
| 8,570,660 B2 | 10/2013 | Takemoto et al. | |

(Continued)

OTHER PUBLICATIONS

Symmons, et al. "Molded Optics: Precision Molded Glass Challenges Plastic Optics," retrieved from http://www.laserfocasworld.com/articles/2011/07/molded-optics-precision-molded-glass-challenges-plastic-optics.html Jul. 1, 2011.

(Continued)

*Primary Examiner* — Evelyn A Lester
(74) *Attorney, Agent, or Firm* — Lathrop & Gage LLP

(57) ABSTRACT

A three-piece all-aspheric adapter fisheye lens includes a negative meniscus lens, a biconvex lens, and a biconcave lens positioned between the negative meniscus lens and the biconvex lens. The lenses are coaxial and are arranged with an exit pupil to cooperatively generate an image with a camera lens that has greater field of view than the camera lens alone when the exit pupil is coplanar and coaxial with an entrance pupil of the camera lens. Each lens has an aspheric object-side surface and an aspheric image-side surface.

16 Claims, 14 Drawing Sheets

210 211 212 220 221 222 230 231 232 250

(56) References Cited

U.S. PATENT DOCUMENTS

2006/0274433 A1* 12/2006 Kamo .................. G02B 15/177
359/793
2007/0139793 A1* 6/2007 Kawada ................. G02B 13/06
359/740
2008/0239517 A1* 10/2008 Mori ........................ G02B 9/34
359/781
2009/0080093 A1* 3/2009 Ning ...................... G02B 13/06
359/753
2010/0246029 A1* 9/2010 Asami .................. G02B 13/004
359/708
2011/0085245 A1 4/2011 Kim
2012/0113532 A1* 5/2012 Lee ........................ G02B 13/06
359/753
2014/0128673 A1 5/2014 Cheng

OTHER PUBLICATIONS

Pontinen, "Study on Chromatic Aberration of Two Fisheye Lenses," The Intl Archives of Photogrammetry, Remote Sensing and Spatial Information Services, vol. XXXVII, Part B3a, Beijing 2008.

* cited by examiner 398
z
r
352
351
330
332
331
320
322
321
350
300
310
370
312
311
D1
379
379
S1
390

| 411 | 412 | 413 | 414 | 415 | 416 | 404 | 406 | 408 | 410 |
|---|---|---|---|---|---|---|---|---|---|
| | | | | | | aspheric coefficient | | | |
| surface | radius $r_c$ (mm) | thickness (mm) | $n_D$ (λ=589 nm) | Abbe Number | conic $k$ | 4th-order term $\alpha_4$ | 6th-order term $\alpha_6$ | 8th-order term $\alpha_8$ | 10th-order term $\alpha_{10}$ |
| object | ∞ | ∞ | -- | -- | -- | -- | -- | -- | -- |
| 311 | 17.947 | 0.641 | 1.543 | 57 | -64.413 | 3.5622E-04 | 1.9198E-05 | -- | -- |
| 312 | 2.862 | 1.756 | | | -0.178 | 9.8620E-03 | 8.3247E-04 | -8.6720E-05 | -- |
| 321 | -33.399 | 0.661 | 1.543 | 57 | -102.020 | -1.8393E-03 | -1.1104E-04 | -- | -- |
| 322 | 6.623 | 1.647 | | | 1.418 | 1.6567E-04 | -5.1386E-05 | -- | -- |
| 331 | 13.601 | 2.600 | 1.543 | 23 | -190.762 | -4.3721E-04 | 1.2038E-05 | -- | -- |
| 332 | -6.762 | 0.750 | | | 27.521 | -3.9211E-03 | 2.5181E-02 | -2.0139E-02 | 9.9936E-03 |
| 351 | ∞ | 2.800 | (ideal lens) | | -- | -- | -- | -- | -- |
| 352 | ∞ | -- | -- | -- | -- | -- | -- | -- | -- |

| surface | radius $r_c$ (mm) | thickness (mm) | $n_D$ (λ=589 nm) | Abbe Number | conic $k$ | aspheric coefficient 4th-order term $\alpha_4$ | 6th-order term $\alpha_6$ | 8th-order term $\alpha_8$ | 10th-order term $\alpha_{10}$ |
|---|---|---|---|---|---|---|---|---|---|
| object | ∞ | ∞ | -- | -- | -- | -- | -- | -- | -- |
| 911 | 15.017 | 0.584 | 1.543 | 57 | -35.488 | -4.5972E-04 | 2.8384E-05 | -- | -- |
| 912 | 2.494 | 1.834 | | | -0.198 | -1.2077E-02 | 1.5658E-03 | -2.1671E-04 | -- |
| 921 | -24.461 | 1.205 | 1.543 | 57 | 15.648 | -4.7104E-03 | -4.6357E-06 | -- | -- |
| 922 | 3.517 | 0.418 | | | -2.077 | -8.1150E-03 | -2.7700E-05 | -- | -- |
| 931 | 6.759 | 2.882 | 1.585 | 30 | -23.760 | -1.0271E-02 | -1.1689E-04 | -- | -- |
| 932 | -4.449 | 0.750 | | | 9.302 | -3.1779E-03 | 2.4293E-02 | -1.5920E-02 | 6.6782E-03 |
| 951 | ∞ | 2.800 | (ideal lens) | | -- | -- | -- | -- | -- |
| 952 | ∞ | -- | -- | -- | -- | -- | -- | -- | -- |

FIG. 10

THREE-PIECE ALL-ASPHERIC ADAPTER FISHEYE LENS

BACKGROUND

Digital camera modules are used in a variety of consumer, industrial and scientific imaging devices to produce still images and/or video. These devices include mobile telephones, digital still image and video cameras, and webcams. The field of view of a camera module is typically between 60 degrees and 70 degrees. The field of view can be increased by attaching an adapter lens in front of the camera module. The resulting imaging system of the adapter lens and camera module has a wider field of view than the camera module alone. A wide field of view is valuable in applications such as autonomous vehicle navigation, car parking monitor systems, and gesture recognition.

SUMMARY OF THE INVENTION

According to an embodiment, a three-piece all-aspheric adapter fisheye (TPAAAF) lens is provided. The TPAAAF lens includes a negative meniscus lens, a biconvex lens, and a biconcave lens positioned between the negative meniscus lens and the biconvex lens. The negative meniscus, biconcave, and biconvex lenses are coaxial and arranged with an exit pupil to cooperatively generate an image with a camera lens that has greater field of view than the camera lens alone when the exit pupil is coplanar and coaxial with an entrance pupil of the camera lens. The negative meniscus, biconcave, and biconvex lenses each have an aspheric object-side surface and an aspheric image-side surface.

According to an embodiment, the negative meniscus lens has a thickness D1 and a semi-diameter S1 of its object-side surface, wherein ratio S1/D1 satisfies 8.0<S1/D1<8.8 for enabling a wide field of view. The object-side surface of the negative meniscus lens has a radius of curvature R1 and the image-side surface of the negative meniscus lens has a radius of curvature R2, wherein ratio R2/R1 satisfies 0.11<R2/R1<0.19 for reducing distortion. The object-side surface of the biconcave lens has a radius of curvature R3 and the image-side surface of the biconcave lens has a radius of curvature R4, wherein ratio R4/R3 satisfies −0.22<R4/R3<−0.12 for reducing field curvature. The object-side surface of the biconvex lens has a radius of curvature R5, and the image-side surface of the biconvex lens has a radius of curvature R6, wherein ratio R6/R5 satisfies −0.7<R6/R5<−0.4 for reducing chromatic aberration and longitudinal aberration. The negative meniscus lens and biconcave lens each have an Abbe number exceeding 55, and the biconvex lens has an Abbe number less than 35 for reducing chromatic aberration.

BRIEF DESCRIPTION OF THE FIGURES

FIG. 4 shows exemplary parameters for the TPAAAF lens of FIG. 3.

FIG. 10 shows exemplary parameters for the fisheye lens of FIG. 9.

DETAILED DESCRIPTION

Figure 1:
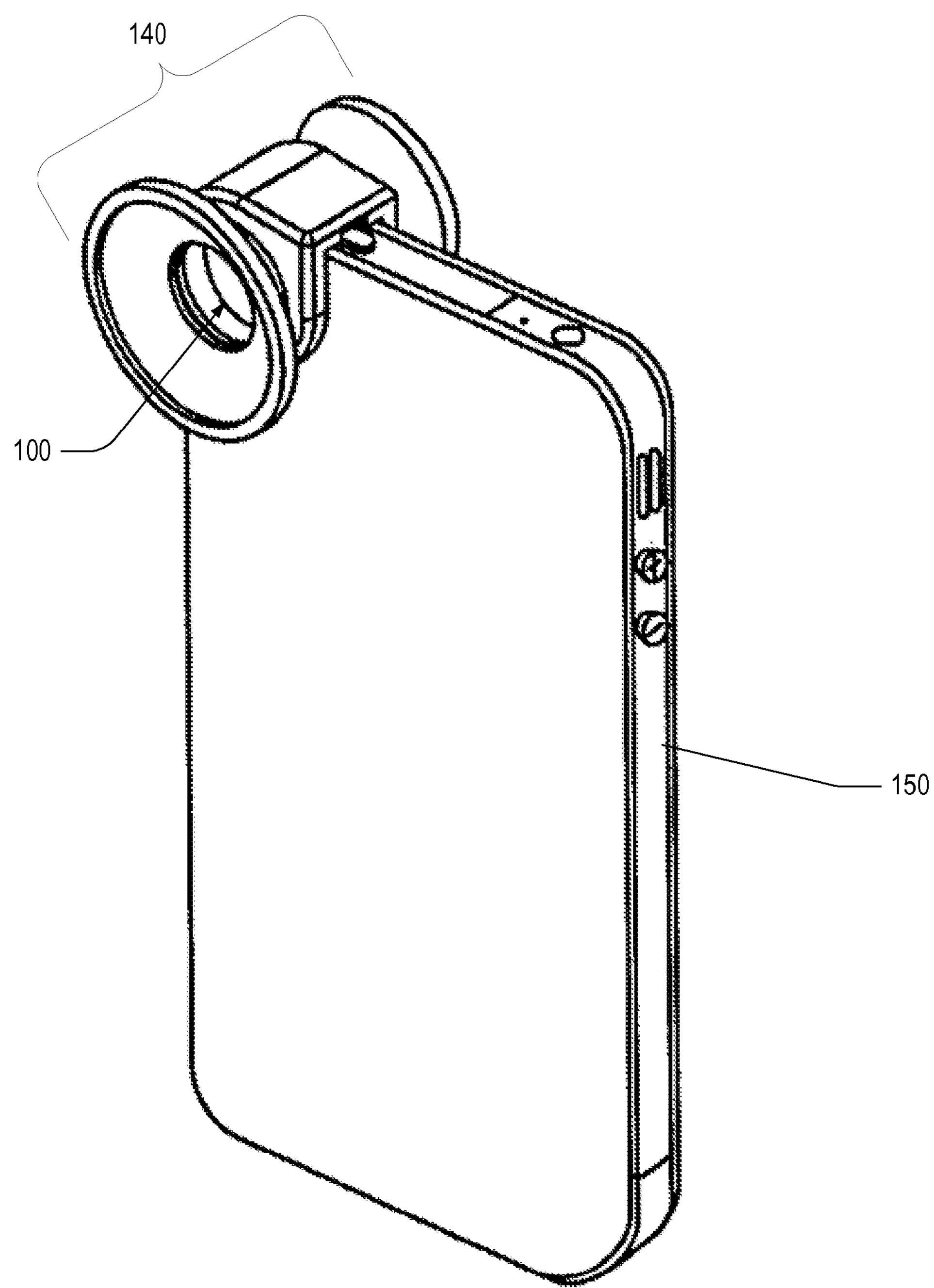
FIG. 1 shows a prior art adapter fisheye lens within an adapter housing and attached to a mobile phone.

FIG. 1 shows a prior-art adapter fisheye lens 100 within a fisheye lens adapter housing 140 that is attached to a mobile phone 150. Mobile phone 150 includes an on-chip camera with a standard field of view. Fisheye lens adapter housing 140 is positioned on mobile phone 150 such that the optic axis of adapter fisheye lens 100 and the optic axis of the on-chip phone camera are coaxial.

Prior-art adapter fisheye lens 100 includes optical elements made of optical glass and/or plastic, for example, one spherical glass lens combined with one aspherical plastic lens. The range of Abbe numbers $V_D$ of optical glasses exceeds that of optical plastics. Thus, the minimum chromatic aberration achievable in compound fisheye lenses with only spherical glass surfaces is lower than a similar lens formed from plastic. However, compared to an all-plastic lens system, the use of a glass in a fisheye lens incurs increased material costs, fabrication costs, weight, volume, and restrictions on manufacturing lens shape.

An all-plastic compound fisheye lens described hereinbelow achieves the performance benefits of glass with the size and weight advantages of plastic. Using aspherical surfaces, rather than just spherical surfaces, more degrees of freedom are achieved when optimizing an all-plastic fisheye lens design to meet desired performance specifications. These performance specifications include minimizing aberrations such as longitudinal aberration (longitudinal spherical aberration), image distortion, field curvature, and lateral color. Optimizing a lens design per these performance metrics is constrained by the relatively narrow range of Abbe numbers in optical plastics, and the benefits of minimizing the number of plastic elements.

This disclosure specifically provides three-piece all-aspheric adapter fisheye (TPAAAF) lenses, wherein the Abbe numbers of each optical element in the TPAAAF corresponds to an existing optical plastic. The TPAAAF lens may be designed to fit into fisheye lens adapter housings, such as fisheye lens adapter housing 140 of FIG. 1.

Figure 2:
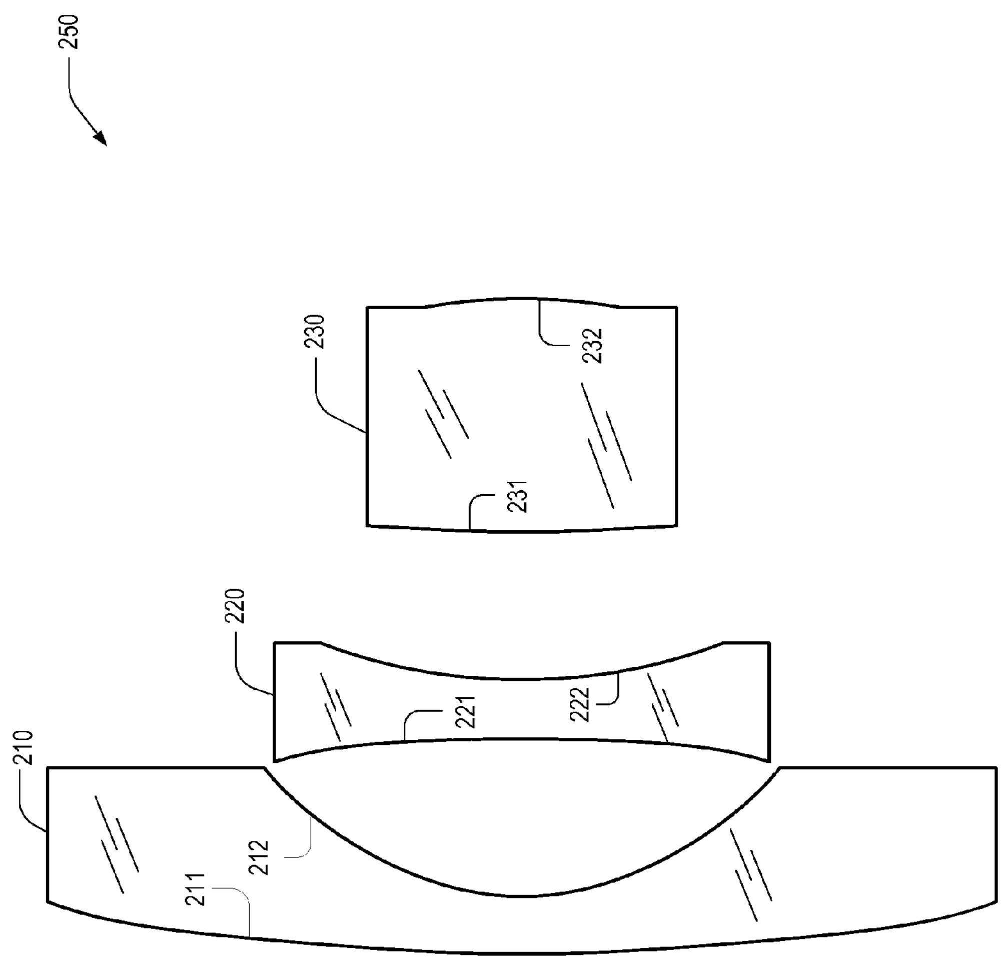
FIG. 2 is a cross-sectional view of a three-piece all-aspheric adapter fisheye (TPAAAF) lens, in an embodiment.

FIG. 2 is a cross-sectional view of one TPAAAF lens 200. TPAAAF lens 200 includes a negative meniscus lens 210, a biconcave lens 220, and a biconvex lens 230. Negative meniscus lens 210 includes an object-side surface 211 and an image-side surface 212. Biconcave lens 220 includes an object-side surface 221 and an image-side surface 222. Biconvex lens 230 includes an object-side surface 231 and an image-side surface 232. In a first embodiment of TPAAAF lens 200, each of the surfaces 211, 212, 221, 222, 231, and 232 are aspheric.

Negative meniscus lens 210, biconcave lens 220, and biconvex lens 230 are each singlet lenses. In an embodiment of TPAAAF lens 200, one or more of negative meniscus lens 210, biconcave lens 220, and biconvex lens 230 may be non-singlet lenses without departing from the scope hereof. TPAAAF lens 200 may be dimensioned so that it replaces adapter fisheye lens 100 in fisheye lens adapter housing 140, FIG. 1.

Referring to negative meniscus lens 210, the semi-diameter of object-side surface 211 is S1 and the on-axis thickness of negative meniscus lens 210 is D1. Embodiments of negative meniscus lens 210 may have a quotient S1/D1 between 8.0 and 8.8. Limiting the quotient S1/D1 to this range enables a wide field of view in imaging systems that include TPAAAF lens 200. For example, imaging systems 350 and 950 discussed herein have respective fields of view exceeding 170°.

Referring to negative meniscus lens 210, object-side surface 211 has radius of curvature R1 and image-side surface 212 has radius of curvature R2. Embodiments of negative meniscus lens 210 may have a quotient R2/R1 between 0.11 and 0.19. Limiting the quotient R2/R1 to this range allows for correcting distortion in imaging systems that include TPAAAF lens 200. For example, at field angles between 0° and 90°, imaging systems 350 and 950 discussed herein have respective distortions less than 11%.

Referring to biconcave lens 220, object-side surface 221 has radius of curvature R3 and image-side surface 222 has radius of curvature R4. Embodiments of biconcave lens 220 may have a quotient R4/R3 between −0.22 and −0.12. Limiting the quotient R4/R3 to this range allows for correcting field curvature in imaging systems that include TPAAAF lens 200. For example, at field angles between 0° and 90°, imaging systems 350 and 950 discussed herein have respective field curvatures less than 0.10 mm.

Referring to biconvex lens 230, object-side surface 231 has radius of curvature R5 and image-side surface 232 has radius of curvature R6. Embodiments of biconvex lens 230 may have a quotient R6/R5 between −0.7 and −0.4. Limiting the quotient R6/R5 to this range allows for correcting chromatic aberration and longitudinal aberration in imaging systems that include TPAAAF lens 200, such as imaging systems 350 and 950 discussed herein. For example, the transverse chromatic aberration (lateral color error) of imaging systems 350 and 950 discussed herein is less than the Airy disk radius. Also, the magnitude of longitudinal aberration of imaging systems 350 and 950 discussed herein is less than 0.04 mm across the entrance pupil radius.

In TPAAAF lens 200, negative meniscus lens 210 and biconcave lens 220 each have Abbe number $V_D>55$. Biconvex lens 230 has an Abbe number $V_D<35$. These constraints on Abbe numbers allow for correcting chromatic aberration in imaging systems that include TPAAAF lens 200, such as imaging systems 350 and 950 discussed herein.

*The Handbook of Plastic Optics* (Wiley-VCH, publisher) lists examples of transparent optical materials with $V_D>55$. These include polymethyl methacrylate (PMMA), and cycloolefin polymers, for example, APEL™ 5014DP, TOPAS® 5013, and ZEONEX® 480R. The lens material with $V_D>55$ may be plastic, glass, or any non-plastic optical material without departing from the scope hereof.

*The Handbook of Plastic Optics* lists examples of transparent optical materials with $V_D<35$. These include PANLITE®, a brand-name polycarbonate, Udel® P-1700, a brand-name polysulfone, and OKP-4, a brand-name optical polyester. The lens material with $V_D<35$ may be plastic, glass, or any non-plastic optical material without departing from the scope hereof.

Lenses 210, 220, and 230 may be formed by injection molding or other methods known in the art. Embodiments of lenses 210, 220, and 230 formed of glass may be formed by precision glass molding (also known as ultra-precision glass pressing) or other methods known in the art.

TPAAAF Lens Example 1

Figure 3:
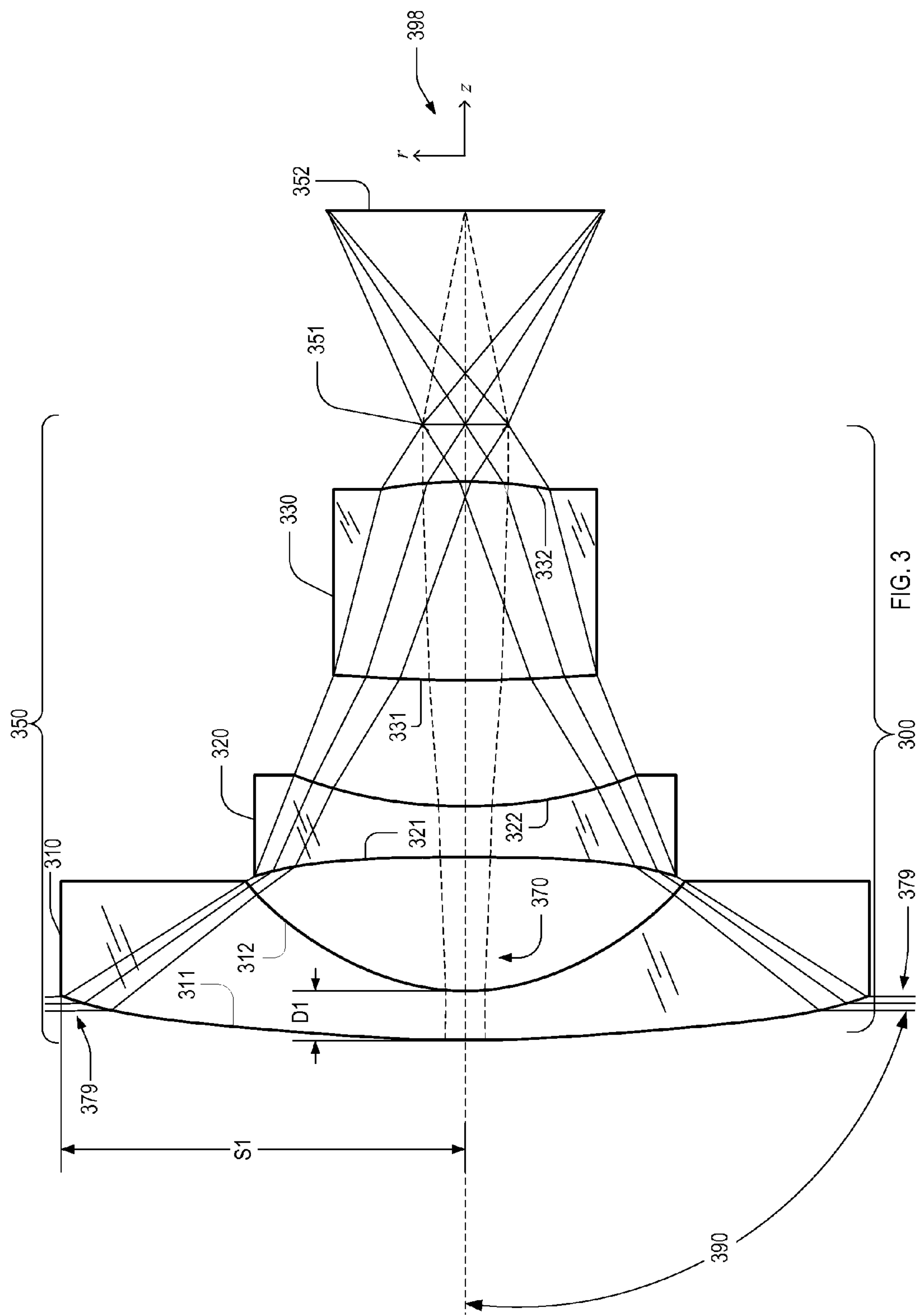
FIG. 3 is a cross-sectional view of a TPAAAF lens functioning as an adapter lens for an imaging system, in an embodiment.

FIG. 3 is a cross-sectional view of a TPAAAF lens 300 functioning as an adapter lens for an imaging system, e.g., for a standard non-fisheye imaging system included in mobile phone 150, FIG. 1. TPAAAF lens 300 is an embodiment of TPAAAF lens 200. TPAAAF lens 300 includes a negative meniscus lens 310, a biconcave lens 320, and a biconvex lens 330 that are analogous to negative meniscus lens 210, biconcave lens 220, and biconvex lens 230 of TPAAAF lens 200. Negative meniscus lens 310 includes an object-side surface 311 and an image-side surface 312. Biconcave lens 320 includes an object-side surface 321 and an image-side surface 322. Biconvex lens 330 includes an object-side surface 331 and an image-side surface 332. In TPAAAF lens 300, each of the surfaces 311, 312, 321, 322, 331, and 332 are aspheric.

Specifically, TPAAAF lens 300 is shown coupled with a camera lens 351 of the standard non-fisheye imaging system such that, collectively, TPAAAF lens 300 and camera lens 351 cooperatively form an image at image plane 352.

TPAAAF lens 300 is variably locatable with respect to a camera lens 351. In FIG. 3, the entrance pupil of camera lens 351 is located at the exit pupil of TPAAAF lens 300, resulting in an imaging system 350. In imaging system 350, the entrance pupil of camera lens 351 and the exit pupil of TPAAAF lens 300 are coaxial and coplanar.

Camera lens 351 is, for example, an imaging lens of a reflowable camera module mounted on a printed circuit board (PCB) of an imaging device such as a mobile phone. But camera lens 351 may alternatively be an imaging lens of other cameras known in the art without departing from the scope hereof; examples include point-and-shoot cameras, compact system cameras, and single-lens reflex cameras. Such cameras may capture still images, video, or both, and be either digital or analog.

For the purpose of characterizing the aberrations caused by TPAAAF lens 300, camera lens 351 is modeled as an aberration-free "perfect lens" with a 66° field of view. However, camera lens 351 may include aberrations and have a different field of view without departing from the scope hereof.

Imaging system 350 is shown with ray traces of ray pencils 370 and 379 computed and displayed by the Zemax® Optical Design Program. Ray pencil 370 and ray pencil 379 propagate from the center and edge of the scene, respectively, through TPAAAF lens 300 and camera lens 351, and focus at image plane 352. Ray pencil 370 has a ray angle of zero. Ray pencil 379 has a ray angle 390 equal to 90°. Being axially symmetric, imaging system 350 has a field of view that is twice ray angle 390, or 180°.

FIG. 4 shows exemplary parameters of each surface of TPAAAF lens 300. Surface column 411 denotes surfaces 311, 312, 321, 322, 331, 332, camera lens 351, and image plane 352 shown in FIG. 3. Column 414 lists the material's refractive index $n_D$ at λ=589.3 nm, and column 415 lists the corresponding Abbe numbers $V_D$. Negative meniscus lens 310 has refractive index $n_D$=1.543, Abbe number $V_D$=57, and includes object-side surface 311 and image-side surface 312. Biconcave lens 320 has refractive index $n_D$=1.543, Abbe number $V_D$=57, and includes object-side surface 321 and image-side surface 322. Biconvex lens 330 has refractive index $n_D$=1.543, Abbe number $V_D$=23, and includes object-side surface 331 and image-side surface 332.

In TPAAAF lens 300, negative meniscus lens 310 and biconcave lens 320 each have Abbe number $V_D$=57. This satisfies a condition that two—and only two—of the three lenses of TPAAAF lens 300 have an Abbe number $V_D$>55. The third lens in TPAAAF lens 300, biconvex lens 330, has Abbe number $V_D$=23, which satisfies a condition that one—and only one—of the three lenses of TPAAAF lens 300 has an Abbe number $V_D$<35.

Column 413 includes on-axis thickness values, in millimeters, between surfaces 311, 312, 321,322, 331, and 332. Surfaces 311, 312, 321,322, 331, and 332 are defined by surface sag $z_{sag}$, Eqn. 1.

$$z_{sag} = \frac{cr^2}{1+\sqrt{1-(1+k)c^2r^2}} + \sum_{i=1}^{N} \alpha_i r^i \quad (1)$$

In Eqn. 1, $z_{sag}$ is a function of radial coordinate r, where directions z and r are shown in coordinate axes 398, FIG. 3. In Eqn. 1, the parameter c is the reciprocal of the surface radius of curvature $r_c$: c=1/$r_c$. Column 412 of FIG. 4 lists $r_c$ values for surfaces 311, 312, 321,322, 331, and 332. Parameter k denotes the conic constant, shown in column 416. Columns 404, 406, 408, and 410 contain values of aspheric coefficients $\alpha_4$, $\alpha_6$, $\alpha_8$, and $\alpha_{10}$, respectively. The units of quantities in FIG. 3 are consistent with $z_{sag}$ in Eqn. 1 being expressed in millimeters.

Referring to negative meniscus lens 310, FIG. 3, the semi-diameter of object-side surface 311 is S1 and the on-axis thickness of negative meniscus lens 310 is D1. The ratio S1/D1=8.2.

Object-side surface 311 has radius of curvature R1 and image-side surface 312 has radius of curvature R2. The ratio R2/R1=0.16. Using R1 and R2 and the thickness D1 of negative meniscus lens 310 (D1=0.641 mm, FIG. 3) in the lens-maker's equation to approximate the focal length F1 of negative meniscus lens 310 results in F1≈−6.4 mm, which means that negative meniscus lens 310 is a negative lens.

Referring to biconcave lens 320, FIG. 3, object-side surface 321 has radius of curvature R3 and image-side surface 322 has radius of curvature R4. The ratio R4/R3=−0.20.

Referring to biconvex lens 330, FIG. 3, object-side surface 331 has radius of curvature R5 and image-side surface 332 has radius of curvature R6. The ratio R6/R5=−0.50.

FIGS. 5-8 are plots of longitudinal aberration, f-Theta distortion, field curvature, and lateral color, respectively, of TPAAAF lens 300 within imaging system 350 as computed by Zemax®. Since camera lens 351 does not contribute to the aberrations shown in FIG. 5-8, the TPAAAF lens 300 is the source of these aberrations. The Zemax® User's Manual includes detailed definitions of each of these quantities.

Figure 5:
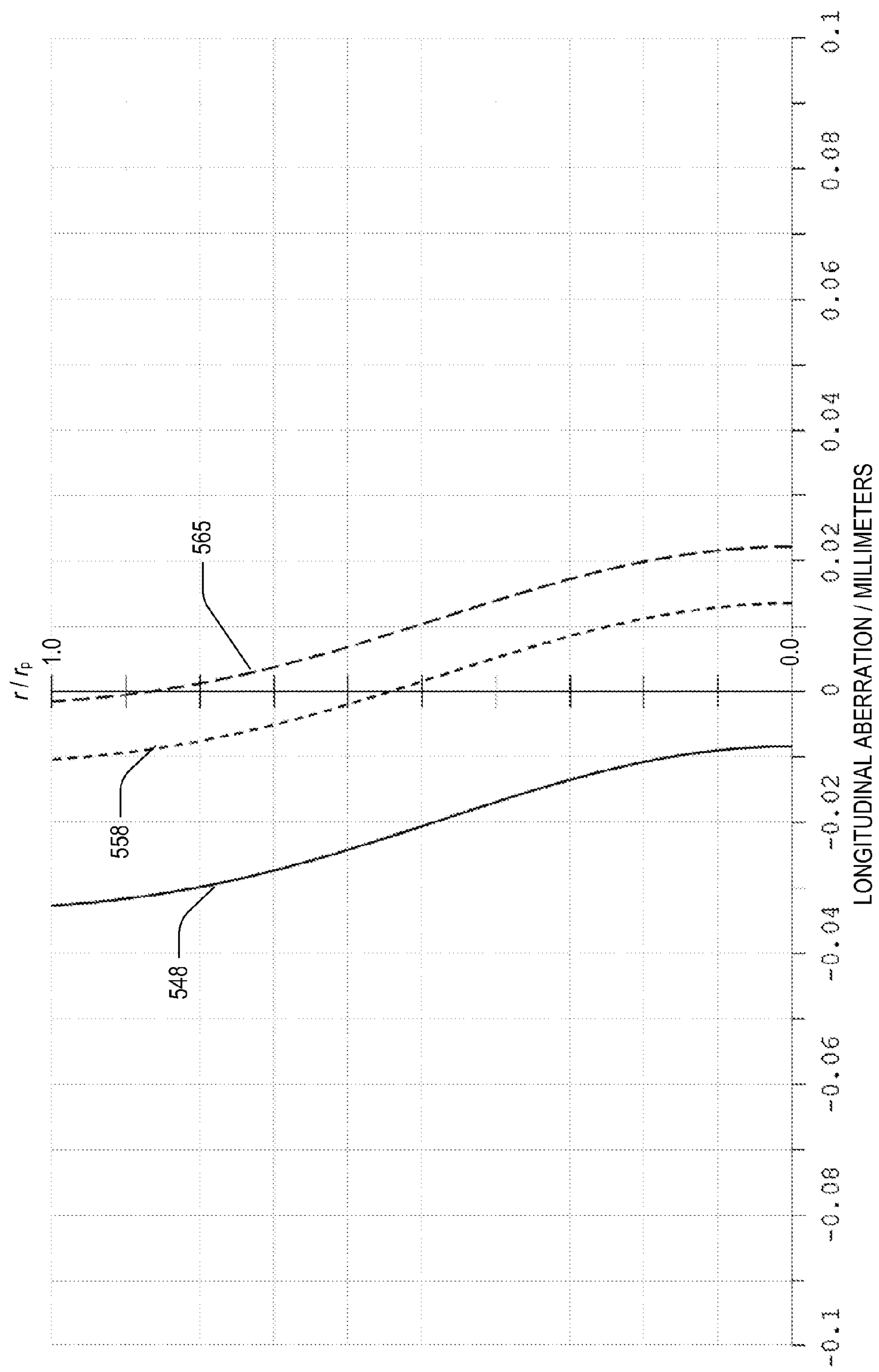
FIG. 5 is a plot of the longitudinal aberration of the TPAAAF lens within the imaging system of FIG. 3.

FIG. 5 is a plot of the longitudinal aberration of TPAAAF lens 300 within imaging system 350. In FIG. 5, longitudinal aberration is plotted in units of millimeters as a function of normalized radial coordinate r/$r_p$, where $r_p$=0.2616 mm is the maximum entrance pupil radius. Longitudinal aberration curves 548, 558, and 565 are computed at the blue, green, and red Fraunhofer F-, D- and C-spectral lines: $\lambda_F$=486.1 nm, $\lambda_D$=589.3 nm, and $\lambda_C$=656.3 nm respectively.

Figure 6:
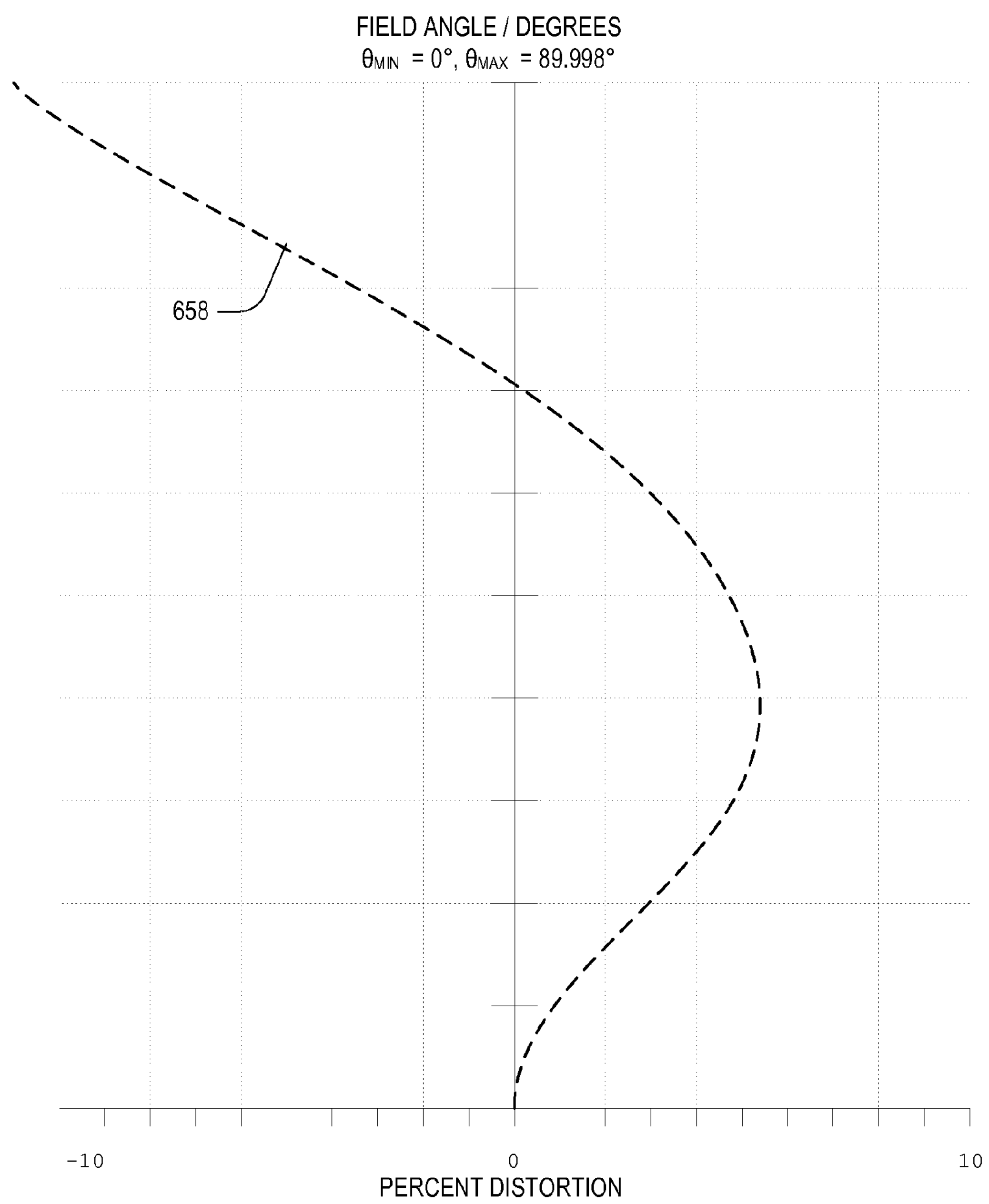
FIG. 6 is a plot of the f-Theta distortion of the TPAAAF lens within the imaging system of FIG. 3.

FIG. 6 is a plot of the f-Theta distortion, versus field angle, of TPAAAF lens 300 within imaging system 350. The maximum field angle plotted in FIG. 6 is $\theta_{max}$=89.998°. Distortion curve 658 is computed at wavelength $\lambda_D$. For clarity, distortion curves corresponding to wavelength $\lambda_F$ and $\lambda_C$ are not shown, as they overlap distortion curve 658 to within its line thickness as plotted in FIG. 6.

Figure 7:
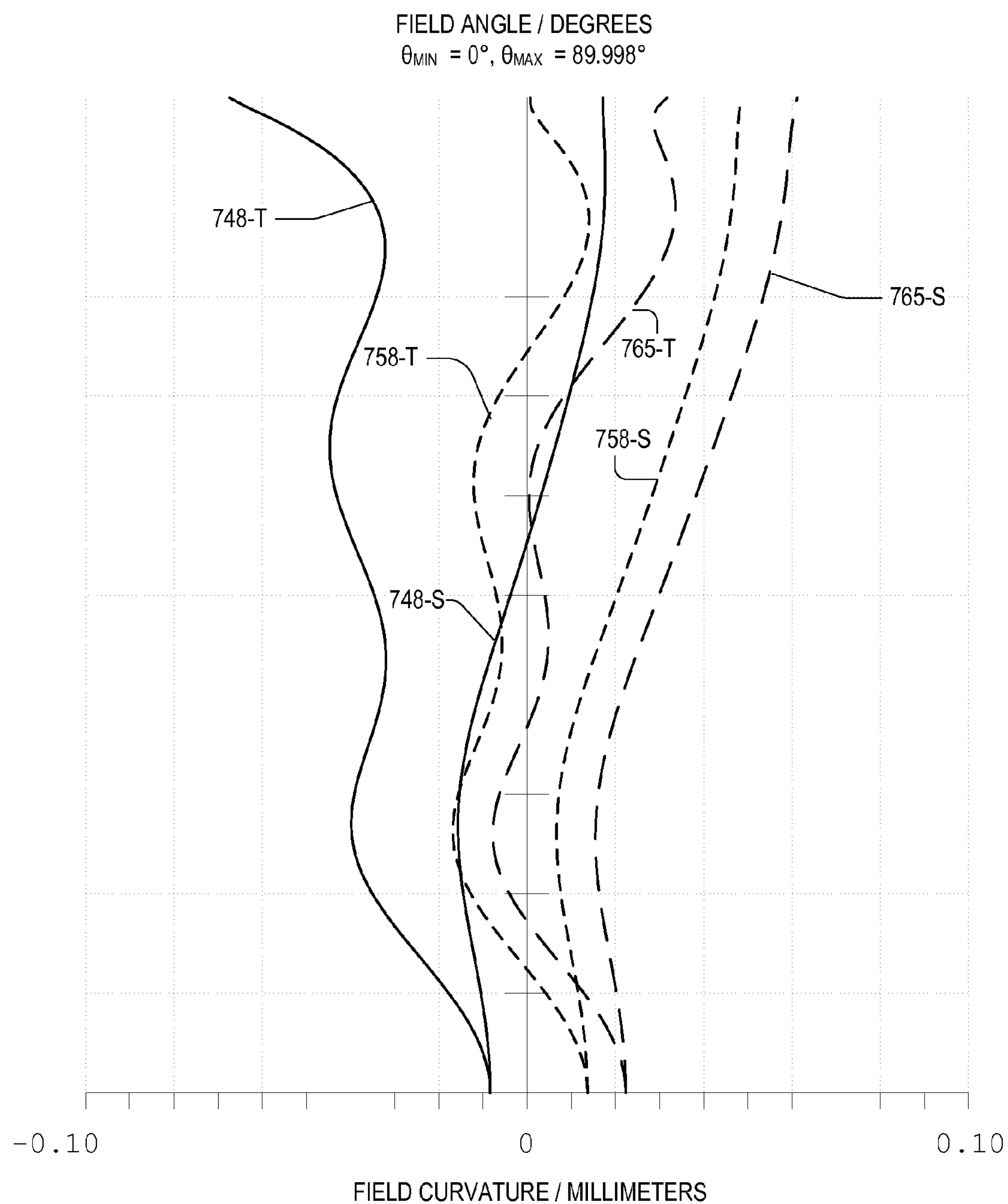
FIG. 7 is a plot of the Petzval field curvature of the TPAAAF lens within the imaging system of FIG. 3.

FIG. 7 is a plot of the Petzval field curvature, as a function of field angle, of TPAAAF lens 300 within imaging system 350. The field curvature is plotted for field angles between zero and is $\theta_{max}$=89.998°. Field curvature 748-S and field curvature 748-T (solid lines) are computed at wavelength 4 in the sagittal and tangential planes, respectively. Field curvature 758-S and field curvature 758-T (short-dashed lines) are computed at wavelength $\lambda_D$ in the sagittal and tangential planes, respectively. Field curvature 765-S and field curvature 765-T (long-dashed lines) correspond to field curvature at wavelength $\lambda_C$ in the sagittal and tangential planes, respectively.

Figure 8:
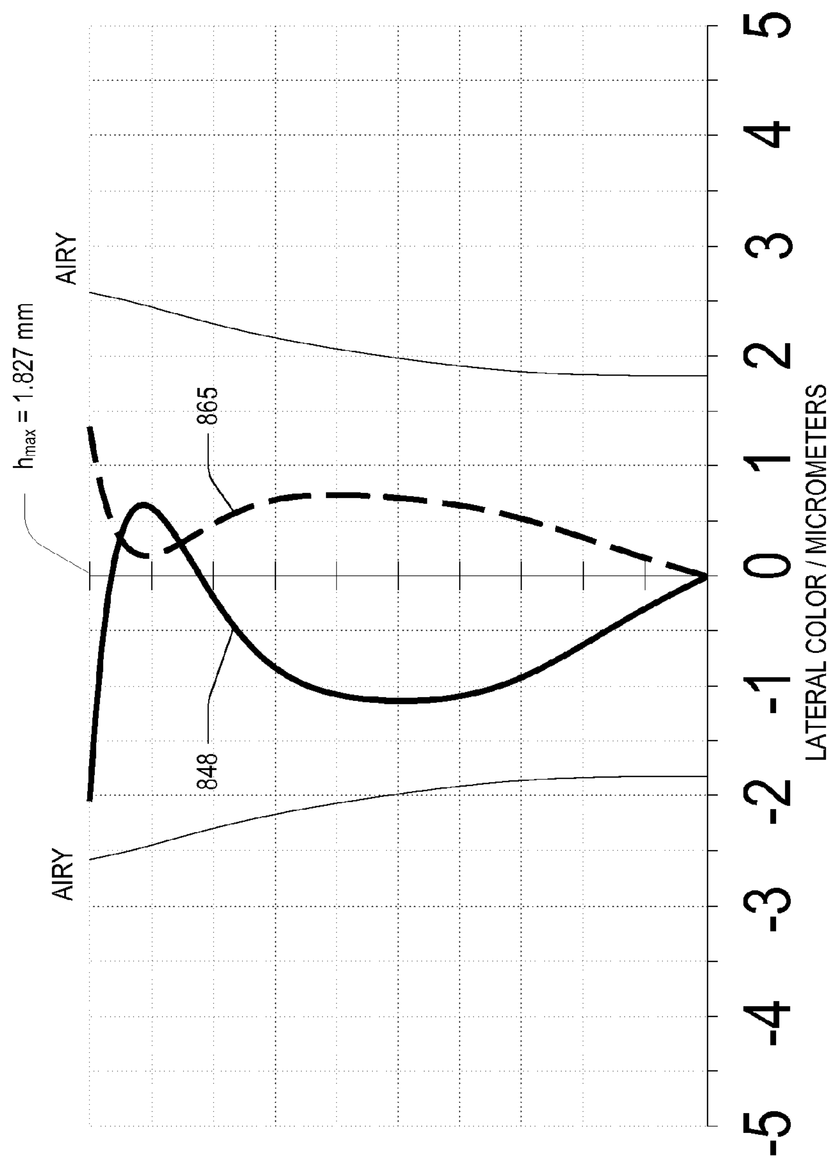
FIG. 8 is a plot of the lateral color error of the TPAAAF lens within the imaging system of FIG. 3.

FIG. 8 is a plot of the lateral color error, also known as transverse chromatic aberration, versus field height of TPAAAF lens 300 within imaging system 350. Field height ranges from $h_{min}$=0 (on-axis) to $h_{max}$=1.827 mm in image plane 352. Lateral color is referenced to $\lambda_D$: the lateral color for $\lambda_D$ is zero for all field heights. Lateral color 848 is computed at wavelength $\lambda_F$. Lateral color 865 is computed at wavelength $\lambda_C$. The lateral color error is less than the Airy disk radius for the range of field heights evaluated.

TPAAAF Lens Example 2

Figure 9:
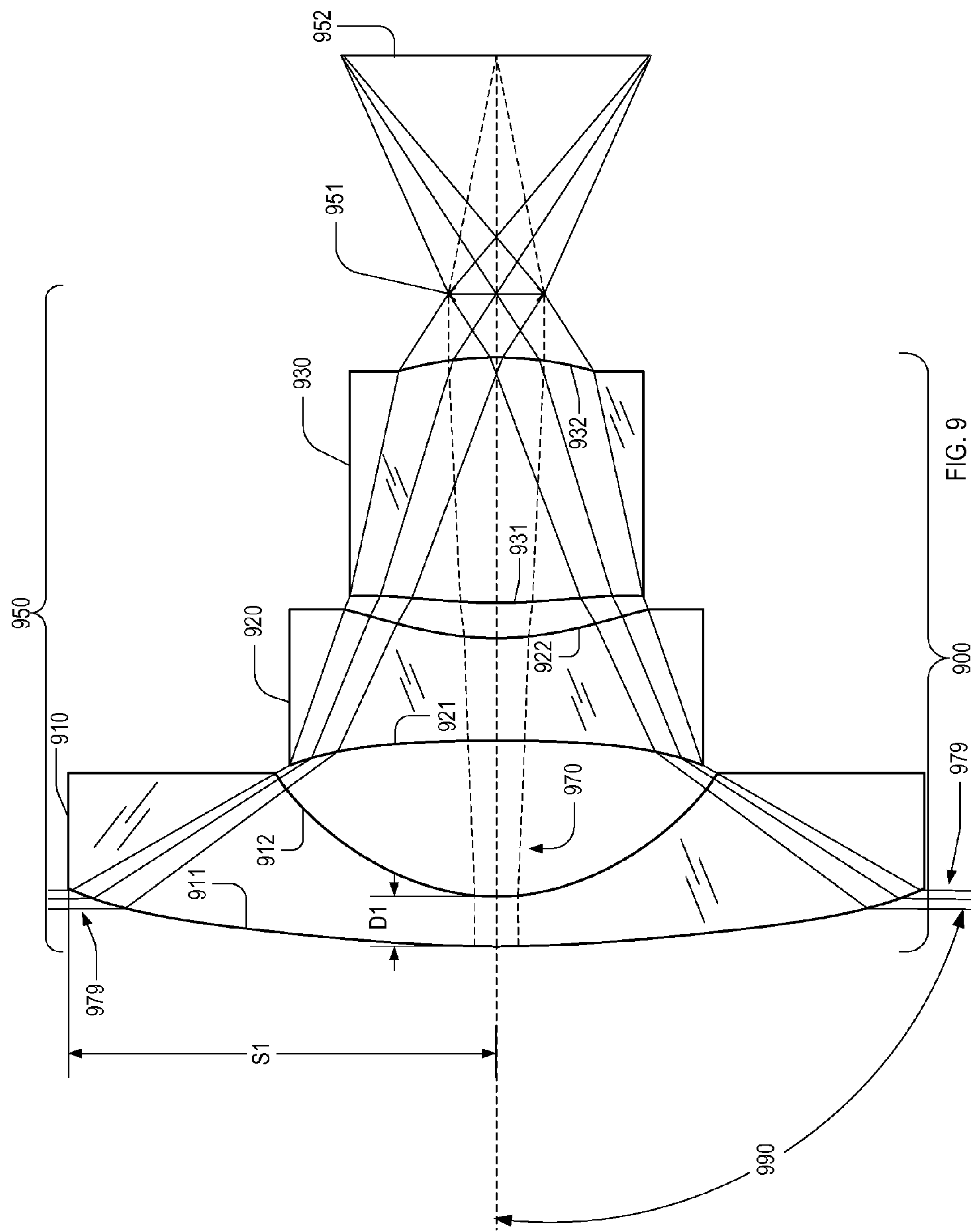
FIG. 9 is a cross-sectional view of a TPAAAF lens functioning as an adapter lens for an imaging system, in an embodiment.

FIG. 9 is a cross-sectional view of a TPAAAF lens 900 functioning as an adapter lens for an imaging system, e.g., for a standard non-fisheye imaging system included in mobile phone 150, FIG. 1. TPAAAF lens 900 is an embodiment of TPAAAF lens 200. TPAAAF lens 900 includes a negative meniscus lens 910, a biconcave lens 920, and a biconvex lens 930 that are analogous to negative meniscus lens 210, biconcave lens 220, and biconvex lens 230 of TPAAAF lens 200. Negative meniscus lens 910 includes an object-side surface 911 and an image-side surface 912. Biconcave lens 920 includes an object-side surface 921 and an image-side surface 922. Biconvex lens 930 includes an object-side surface 931 and an image-side surface 932. In TPAAAF lens 900, each of the surfaces 911, 912, 921, 922, 931, and 932 are aspheric Specifically, TPAAAF lens 900 is shown coupled with a camera lens 951 of the standard non-fisheye imaging system such that, collectively, TPAAAF lens 900 and camera lens 951 cooperatively form an image at image plane 952.

TPAAAF lens 900 is variably locatable with respect to a camera lens 951. In FIG. 9, the entrance pupil of camera lens 951 is located at the exit pupil of TPAAAF lens 900, resulting in an imaging system 950. In imaging system 950, the entrance pupil of camera lens 951 and the exit pupil of TPAAAF lens 900 are coaxial and coplanar.

Camera lens 951 is, for example, an imaging lens of a reflowable camera module mounted on a PCB of an imaging device. For the purpose of characterizing the aberrations caused by TPAAAF lens 900, in FIG. 9 camera lens 951 is modeled as an aberration-free "perfect lens" with a 66° field of view. Camera lens 951 is similar to camera lens 351.

Imaging system 950 is shown with ray traces of ray pencils 970 and 979 as computed and displayed by the Zemax® Optical Design Program. Ray pencil 970 and ray pencil 979 propagate from the center and edge of the scene, respectively, through TPAAAF lens 900 and camera lens 951, and focus at image plane 952. Ray pencil 970 has a ray angle of zero. Ray pencil 979 has a ray angle 990 equal to 90°. Being axially symmetric, imaging system 950 has a field of view that is twice ray angle 990, or 180°.

FIG. 10 shows parameters of each surface of TPAAAF lens 900. Surface column 1011 denotes surfaces 911, 912, 921, 922, 931, 932, camera lens 951, and image plane 952 shown in FIG. 9. Negative meniscus lens 910 has refractive index $n_D$=1.543, Abbe number $V_D$=57, and includes surface 911 and surface 912. Biconcave lens 920 has refractive index $n_D$=1.543, Abbe number $V_D$=57, and includes surface 921 and surface 922. Biconvex lens 930 has refractive index $n_D$=1.543, Abbe number $V_D$=30, and includes object-side surface 931 and image-side surface 932.

Column 1013 contains thickness values, in millimeters, between surfaces 911, 912, 921, 922, 931, and 932. Surfaces 911, 912, 921, 922, 931, and 932 are defined by $z_{sag}$, Eqn. 1. Columns 1012, 1014, 1015, 1016, 1004, 1006, 1008, and 1010 are similar to columns 412, 414, 415, 416, 404, 406, 408, and 410, respectively, of FIG. 4.

Referring to negative meniscus lens 910, FIG. 9, the semi-diameter of the object side of negative meniscus lens 910 is S1 and the on-axis thickness of negative meniscus lens 910 is D1. The ratio S1/D1=8.5.

Object-side surface 911 has radius of curvature R1 and image-side surface 912 has radius of curvature R2. The ratio R2/R1=0.17. Using R1 and R2 and the thickness D1 of negative meniscus lens 910 (D1=0.584 mm, FIG. 9) in the lens-maker's equation to approximate the focal length F1 of negative meniscus lens 910 results in F1≈−5.6 mm, which means that negative meniscus lens 910 is a negative lens.

Referring to biconcave lens 920, FIG. 9, object-side surface 921 has radius of curvature R3 and image-side surface 922 has radius of curvature R4. The ratio R4/R3=−0.14.

Referring to biconvex lens 930, FIG. 9, object-side surface 931 has radius of curvature R5 and image-side surface 932 has radius of curvature R6. The ratio R6/R5=−0.66.

FIGS. 11-14 are plots of longitudinal aberration, f-Theta distortion, field curvature, and lateral color, respectively, of TPAAAF lens 900 within imaging system 950 as computed by Zemax®. Since camera lens 951 does not contribute to the aberrations shown in FIG. 11-14, TPAAAF lens 900 is the source of these aberrations.

Figure 11:
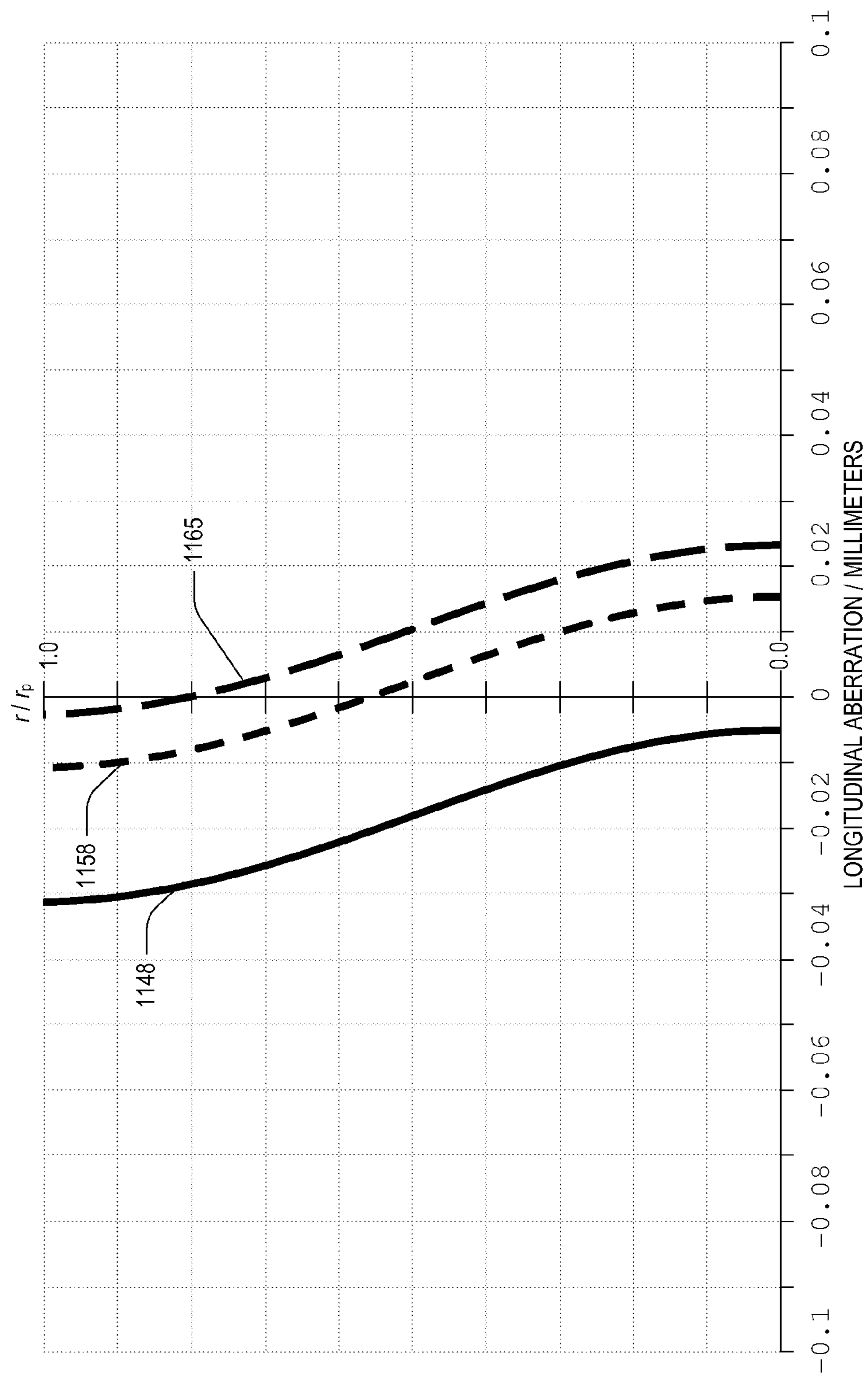
FIG. 11 is a plot of the longitudinal aberration of the TPAAAF lens within the imaging system of FIG. 9.

FIG. 11 is a plot of the longitudinal aberration of TPAAAF lens 900 within imaging system 950. In FIG. 11, longitudinal aberration is plotted in units of millimeters as a function of normalized radial coordinate $r/r_p$, where $r_p$=0.2553 mm is the maximum entrance pupil radius. Longitudinal aberration curves 1148, 1158, and 1165 are computed at $\lambda_F$, $\lambda_D$, and $\lambda_C$ respectively.

Figure 12:
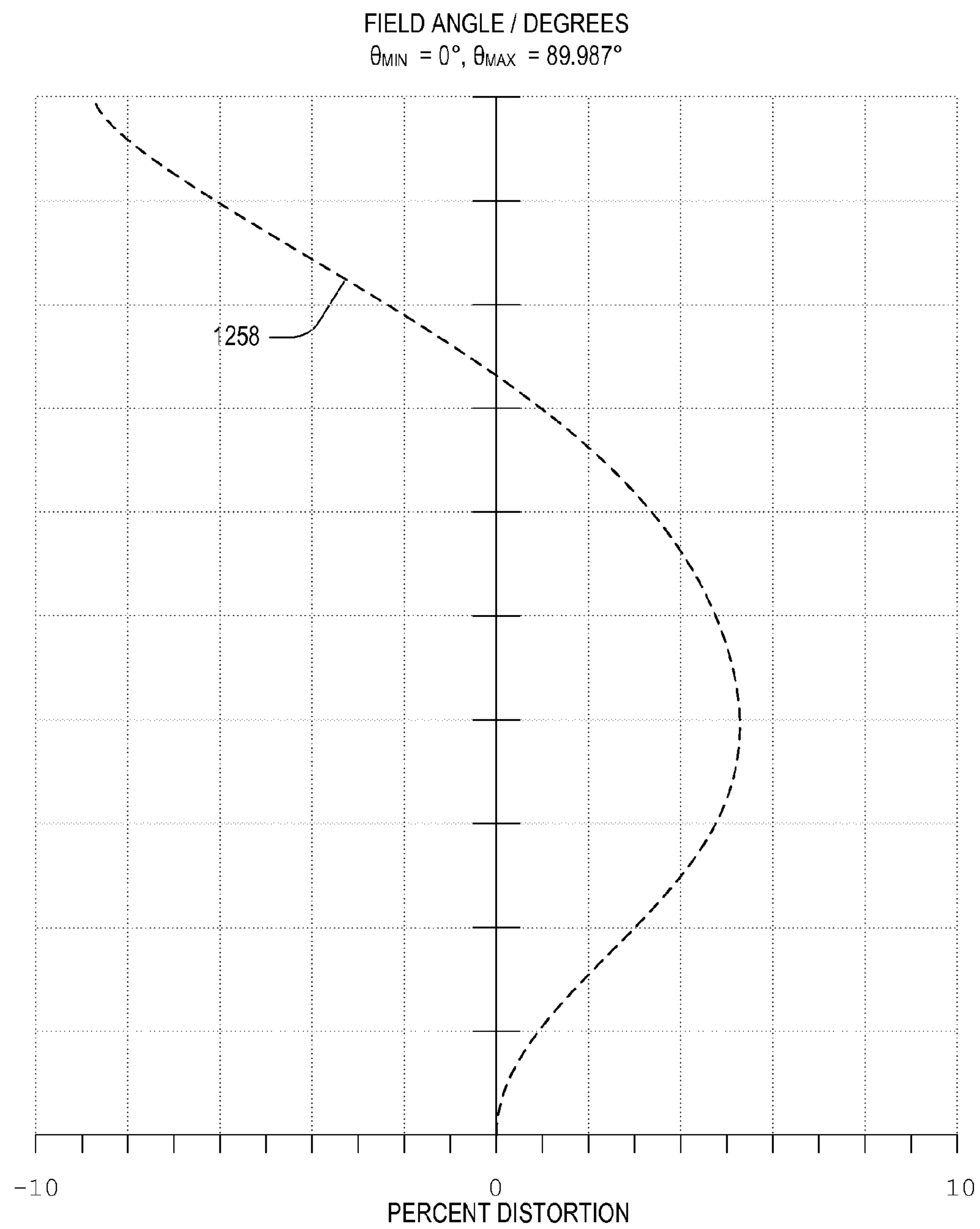
FIG. 12 is a plot of the f-Theta distortion of the TPAAAF lens within the imaging system of FIG. 9.

FIG. 12 is a plot of the f-Theta distortion, versus field angle, of TPAAAF lens 900 within imaging system 950. The f-Theta distortion is plotted for field angles between zero and is $\theta_{max}$=89.987°. Distortion curve 1258 is computed at wavelength $\lambda_D$. For clarity, distortion curves corresponding to wavelength $\lambda_F$ and $\lambda_C$ are not shown, as they overlap distortion curve 1258 to within its line thickness as plotted in FIG. 12.

Figure 13:
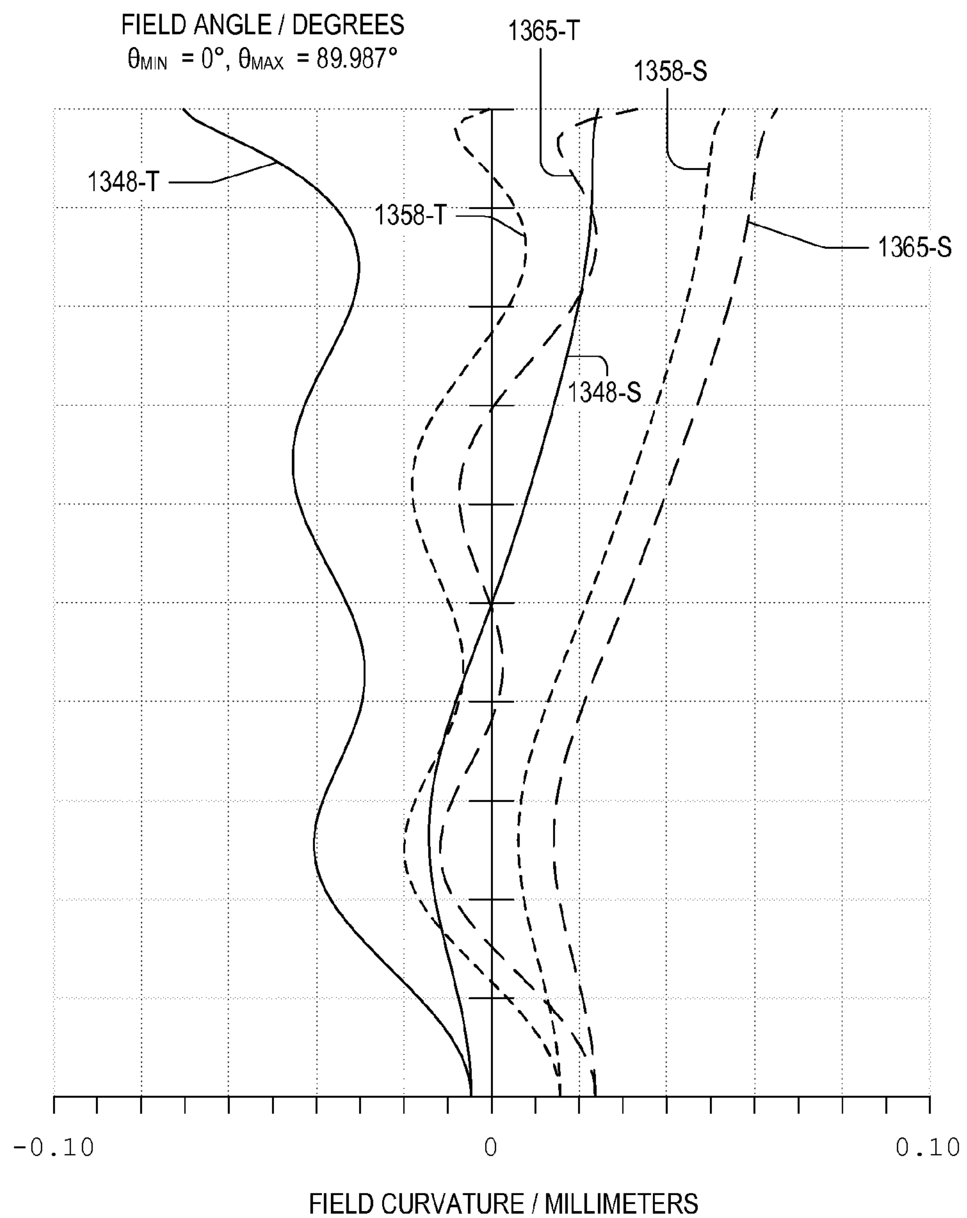
FIG. 13 is a plot of the Petzval field curvature of the TPAAAF lens within the imaging system of FIG. 9.

FIG. 13 is a plot of the Petzval field curvature, as a function of field angle, of TPAAAF lens 900 within imaging system 950. The field curvature is plotted for field angles between zero and is $\theta_{max}$=89.987°. Field curvature curves 1348-S and 1348-T (solid lines) are computed at wavelength $\lambda_F$ in the sagittal and tangential planes, respectively. Field curvature curves 1358-S and 1358-T (short-dashed lines) are computed at wavelength $\lambda_D$ in the sagittal and tangential planes, respectively. Field curvature curves 1365-S and 1365-T (long-dashed lines) correspond to field curvature at wavelength $\lambda_C$ in the sagittal and tangential planes, respectively.

Figure 14:
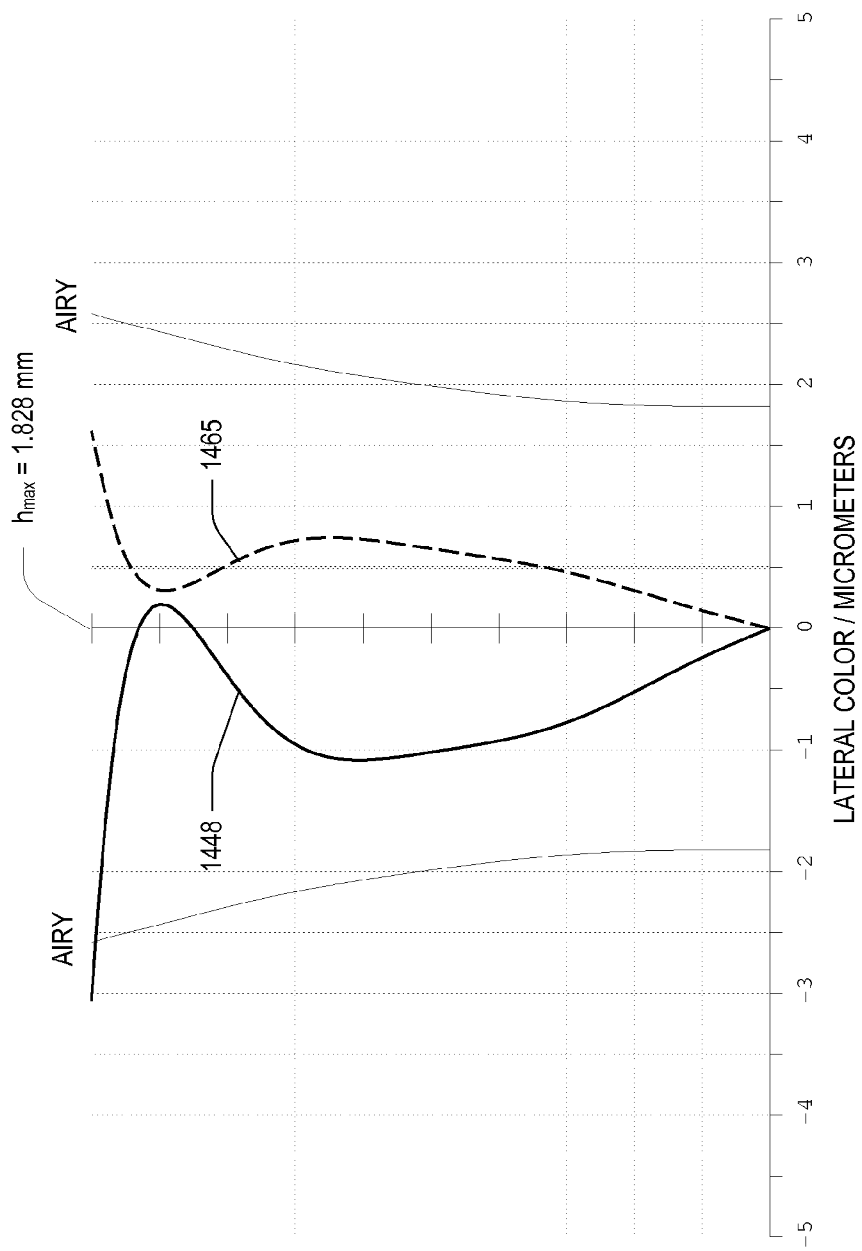
FIG. 14 is a plot of the lateral color error of the TPAAAF lens within the imaging system of FIG. 9.

FIG. 14 is a plot of the lateral color error versus field height of TPAAAF lens 900 within imaging system 950. Field height ranges from $h_{min}$=0 (on-axis) to $h_{max}$=1.828 mm in image plane 952. Lateral color is referenced to $\lambda_D$: the lateral color for $\lambda_D$ is zero for all field heights. Lateral color 1448 is computed at wavelength $\lambda_F$. Lateral color 1448 is less than the Airy disk radius for all but the highest one percent of field heights evaluated. Lateral color 1465 is computed at wavelength $\lambda_C$. Lateral color 1465 is less than the Airy disk radius for the full range of field heights evaluated.

Combinations of Features

Features described above as well as those claimed below may be combined in various ways without departing from the scope hereof. For example, it will be appreciated that aspects of TPAAAF lens described herein may incorporate or swap features of another TPAAAF lens described herein. The following examples illustrate possible, non-limiting combinations of embodiments described above. It should be clear that many other changes and modifications may be made to the methods and device herein without departing from the spirit and scope of this invention:

(A1) A TPAAAF lens comprising a negative meniscus lens, a biconvex lens, and a biconcave lens positioned between the negative meniscus lens and the biconvex lens. The negative meniscus, biconcave, and biconvex lenses are coaxial and arranged with an exit pupil to cooperatively generate an image with a camera lens that has greater field of view than the camera lens alone when the exit pupil is coplanar and coaxial with an entrance pupil of the camera lens. The negative meniscus, biconcave, and biconvex lenses each have an aspheric object-side surface and an aspheric image-side surface.

(A2) The TPAAAF lens denoted as (A1), the negative meniscus lens, the biconcave lens, and the biconvex lens each being singlet lenses.

(A3) In either of the TPAAAF lenses denoted as (A1) or (A2), the camera lens has a first field of view less than 90 degrees. The negative meniscus lens, the biconcave lens, the biconvex lens, and the camera lens cooperatively have a second field of view exceeding 170 degrees.

(A4) In any of the TPAAAF lenses denoted as (A1) through (A3), each lens being formed of a plastic material.

(A5) In any of the TPAAAF lenses denoted as (A1) through (A4), each lens being injection molded.

(A6) In any of the TPAAAF lenses denoted as (A1) through (A5), the negative meniscus lens having a thickness D1 and a semi-diameter S1 of its object-side surface, and the ratio S1/D1 satisfying 8.0<S1/D1<8.8.

(A7) In any of the TPAAAF lenses denoted as (A1) through (A6), the object-side surface of the negative meniscus lens having a radius of curvature R1, the image-side surface of the negative meniscus lens having a radius of curvature R2; and the ratio R2/R1 satisfying 0.11<R2/R1<−0.19.

(A8) In any of the TPAAAF lenses denoted as (A1) through (A7), the object-side surface of the biconcave lens having a radius of curvature R3; the image-side surface of the biconcave lens having a radius of curvature R4; and the ratio R4/R3 satisfying −0.22<R4/R3<−0.12.

(A9) In any of the TPAAAF lenses denoted as (A1) through (A8), the image-side surface of the biconvex lens having a radius of curvature R6; and the radii R5 and R6 satisfying −0.7<R6/R5<−0.4.

(A10) In any of the TPAAAF lenses denoted as (A1) through (A9), the negative meniscus lens and biconcave lens each have an Abbe number exceeding 55, and the biconvex lens has an Abbe number less than 35.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

What is claimed is:

1. A three-piece all-aspheric adapter fisheye (TPAAAF) lens, comprising:

a negative meniscus lens, a biconvex lens, and a biconcave lens positioned between the negative meniscus lens and the biconvex lens;

the negative meniscus, biconcave, and biconvex lenses being coaxial and arranged with an exit pupil to cooperatively generate an image with a camera lens that has greater field of view than the camera lens alone when the exit pupil is coplanar and coaxial with an entrance pupil of the camera lens; and the negative meniscus, biconcave, and biconvex lenses each having an aspheric object-side surface and an aspheric image-side surface.

2. The TPAAAF lens of claim 1, each of the negative meniscus lens, biconcave lens and biconvex lens being singlets.

3. The TPAAAF lens of claim 1, the camera lens having a first field of view less than 90 degrees;

the negative meniscus lens, biconcave lens, biconvex lens, and the camera lens cooperatively having a second field of view exceeding 170 degrees.

4. The TPAAAF lens of claim 1, each of the negative meniscus, biconcave, and biconvex lenses formed of plastic material.

5. The TPAAAF lens of claim 1, each of the negative meniscus, biconcave, and biconvex lenses being injection molded.

6. The TPAAAF lens of claim 1, the negative meniscus lens having a thickness D1 and the object-side surface having a semi-diameter S1, wherein ratio S1/D1 satisfies $8.0 < S1/D1 < 8.8$ for enabling a wide field of view.

7. The TPAAAF lens of claim 1, the object-side surface of the negative meniscus lens having a radius of curvature R1; the image-side surface of the negative meniscus lens having a radius of curvature R2; wherein ratio R2/R1 satisfies $0.11 < R2/R1 < 0.19$ for reducing distortion.

8. The TPAAAF lens of claim 1, the object-side surface of the biconcave lens having a radius of curvature R3; the image-side surface of the biconcave lens having a radius of curvature R4; wherein ratio R4/R3 satisfies $-0.22 < R4/R3 < -0.12$ for reducing field curvature.

9. The TPAAAF lens of claim 1, the object-side surface of the biconvex lens having a radius of curvature R5; the image-side surface of the biconvex lens having a radius of curvature R6; wherein ratio R6/R5 satisfies $-0.7 < R6/R5 < -0.4$ for reducing chromatic aberration and longitudinal aberration.

10. The TPAAAF lens of claim 1, the negative meniscus lens and biconcave lens each having an Abbe number exceeding 55, and the biconvex lens having an Abbe number less than 35, for reducing chromatic aberration.

11. A three-piece all-aspheric adapter fisheye (TPAAAF) lens, comprising:

a negative meniscus lens, a biconvex lens, and a biconcave lens positioned between the negative meniscus lens and the biconvex lens;

the negative meniscus, biconcave, and biconvex lenses being coaxial and arranged with an exit pupil to cooperatively generate an image with a camera lens that has greater field of view than the camera lens alone when the exit pupil is coplanar and coaxial with an entrance pupil of the camera lens;

the negative meniscus, biconcave, and biconvex lenses each having an aspheric object-side surface and an aspheric image-side surface; and the negative meniscus lens having a thickness D1 and the object-side surface having a semi-diameter S1, wherein ratio S1/D1 satisfies $8.0 < S1/D1 < 8.8$ for enabling a wide field of view;

the object-side surface of the negative meniscus lens having a radius of curvature R1, the image-side surface of the negative meniscus lens having a radius of curvature R2; wherein ratio R2/R1 satisfies $0.11 < R2/R1 < 0.19$ for reducing distortion;

the object-side surface of the biconcave lens having a radius of curvature R3; the image-side surface of the biconcave lens having a radius of curvature R4; wherein ratio R4/R3 satisfies $-0.22 < R4/R3 < -0.12$ for reducing field curvature;

the object-side surface of the biconvex lens having a radius of curvature R5; the image-side surface of the biconvex lens having a radius of curvature R6; wherein ratio R6/R5 satisfies $-0.7 < R6/R5 < -0.4$ for reducing chromatic aberration and longitudinal aberration; and the negative meniscus lens and biconcave lens each having an Abbe number exceeding 55, and the biconvex lens having an Abbe number less than 35, for reducing chromatic aberration.

12. The TPAAAF lens of claim 11, each of the negative meniscus lens, biconcave lens and biconvex lens being singlets.

13. The TPAAAF lens of claim 11, the camera lens having a first field of view less than 90 degrees;

the negative meniscus lens, biconcave lens, biconvex lens, and the camera lens cooperatively having a second field of view exceeding 170 degrees.

14. The TPAAAF lens of claim 11, each lens being formed of a plastic material.

15. The TPAAAF lens of claim 11, each lens being injection molded.

16. A three-piece all-aspheric adapter fisheye (TPAAAF) lens, comprising:

a negative meniscus lens, a biconvex lens, and a biconcave lens positioned between the negative meniscus lens and the biconvex lens;

the negative meniscus, biconcave, and biconvex lenses being coaxial and arranged with an exit pupil to cooperatively generate an image with a camera lens that has greater field of view than the camera lens alone when the exit pupil is coplanar and coaxial with an entrance pupil of the camera lens;

each of the negative meniscus lens, biconcave lens and biconvex lens being singlets;

the negative meniscus, biconcave, and biconvex lenses each having an aspheric object-side surface and an aspheric image-side surface;

the camera lens having a first field of view less than 90 degrees;

the negative meniscus lens, biconcave lens, biconvex lens, and the camera lens cooperatively having a second field of view exceeding 170 degrees;

each lens being formed of a plastic material;

each lens being injection molded;

the negative meniscus lens having a thickness D1, the object-side surface having a semi-diameter S1, wherein ratio S1/D1 satisfies $8.0<S1/D1<8.8$ for enabling a wide field of view;

the object-side surface of the negative meniscus lens having a radius of curvature R1, the image-side surface of the negative meniscus lens having a radius of curvature R2; wherein ratio R2/R1 satisfies $0.11<R2/R1<0.19$ for reducing astigmatism and distortion;

the object-side surface of the biconcave lens having a radius of curvature R3; the image-side surface of the biconcave lens having a radius of curvature R4; wherein ratio R4/R3 satisfies $-0.22<R4/R3<-0.12$ for reducing field curvature;

the object-side surface of the biconvex lens having a radius of curvature R5; the image-side surface of the biconvex lens having a radius of curvature R6; wherein ratio R6/R5 satisfies $-0.7<R6/R5<-0.4$ for reducing chromatic aberration and longitudinal aberration; and the negative meniscus lens and biconcave lens each having an Abbe number exceeding 55, and the biconvex lens having an Abbe number less than 35, for reducing chromatic aberration.

* * * * *